US008837826B1

United States Patent
Gaddy et al.

(10) Patent No.: US 8,837,826 B1
(45) Date of Patent: Sep. 16, 2014

(54) SYSTEM AND METHOD FOR TRANSMISSION, RECEPTION, AND RESTORATION OF DECIMATED COLOR CHANNELS IN IMAGE DATA

(71) Applicant: Spinella IP Holdings, Inc., Colts Neck, NJ (US)

(72) Inventors: William L. Gaddy, Milford, PA (US); Vidhya Seran, Irving, TX (US); Yong Liu, Edison, NJ (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 0 days.

(21) Appl. No.: 14/302,565

(22) Filed: Jun. 12, 2014

(51) Int. Cl.
*G06K 9/00* (2006.01)
*G06T 3/40* (2006.01)

(52) U.S. Cl.
CPC .................... *G06T 3/4092* (2013.01)
USPC ....................................... 382/166

(58) Field of Classification Search
USPC .................. 382/166, 167, 232, 240
See application file for complete search history.

(56) References Cited

U.S. PATENT DOCUMENTS

2010/0177828 A1* 7/2010 Rubinstein et al. ...... 375/240.26
2013/0321674 A1* 12/2013 Cote et al. ..................... 382/167

* cited by examiner

*Primary Examiner* — Duy M Dang
(74) *Attorney, Agent, or Firm* — Lowenstein Sandler LLP

(57) ABSTRACT

A processing device receives a first set of image data comprising one or more chroma channels and a luma channel. The processing device reduces the resolution of the one or more chroma channels to produce one or more reduced-resolution chroma channels. The processing device arranges the luma channel and the one or more reduced-resolution chroma channels into a second set of image data. The spatial coordinates of the luma channel and the one or more reduced-resolution chroma channels do not overlap in spatial location of the second set of image data. The processing device transmits the second set of image data to a downstream device.

30 Claims, 12 Drawing Sheets

SYSTEM AND METHOD FOR TRANSMISSION, RECEPTION, AND RESTORATION OF DECIMATED COLOR CHANNELS IN IMAGE DATA

TECHNICAL FIELD

Embodiments of the present disclosure relate to image processing, and, more particularly, to the transmission, reception, and restoration of decimated color channels within video or images.

BACKGROUND

It is known that the Human Vision System (hereinafter, "HVS") is more sensitive to spatial detail in the luminance domain than in the color domain. Precise measurements of this effect have shown that under normal daytime viewing conditions, the HVS has approximately 2.2 times more spatial acuity for brightness details than for color details. Efficient transmission and processing of images and video (such as seen in JPEG (see ISO/IEC 10918-1:1994) and most video compression systems, such as MPEG and its derivatives (see ISO/IEC 13818, ISO/IEC 14496, and ISO/IEC 23008) leverages this effect by separating the brightness (Y, or luma) channel from the color (CbCr, or chroma) channels and then reducing the resolution of the chroma channels by one octave by decimation before encoding and transmission. This is commonly known as 4:2:0 chroma subsampling. The presence of these decimated chroma channels is signaled from the encoder to the decoder by means of a bitstream flag. Upon reception and decoding, the presence of the bitstream flag indicates to the decoder to upscale the chroma channels, usually by a simple upsampling process such as bicubic interpolation or bilinear interpolation.

Decimation of the chroma channels by more than one octave can significantly reduce the amount of information to transmit, but the decoded and upscaled chroma channels exhibit a variety of artifacts, including reduced saturation of small objects, and color bleed—the perception that a color from a small object is smearing into neighboring background objects. Primarily for this reason, decimation of the chroma channels by more than one octave is not supported in any current image or video compression standard.

There has been some recent work in using more advanced upscaling methods for image-guided scaling, such as taught in Kopf, Johannes, et al. "Joint bilateral upsampling," ACM Transactions on Graphics (TOG), Vol. 26, No. 3. ACM, 2007, which is incorporated herein by reference, in the form of joint-bilateral sampling to permit restoration of a decimated depth map for 3D images that may be applied to the restoration of decimated chroma channels that have been decimated by more than one octave. However, implementing these methods require close coupling and changes to the encoding and decoding standards for images and video, since the bitstream syntax does not support signaling such channels decimated by more than one octave.

Additionally, simply downscaling the chroma channels by more than one octave and passing the decimated chroma channels co-mingled with the full resolution luma channel confuses the motion estimation of most video encoders, since they rely on the spatial correspondence of the luma and the chroma channels in order to achieve accurate motion estimation, thereby reducing their efficiency. Further, in low-bitrate, high-quantization scenarios for both image encodes and video encoders, co-mingled chroma channels may leave a visible imprint upon the luma channel, causing an artifact recognizable as a shadow of the chroma channel upon the luma channel.

SUMMARY

The above-described problems are remedied and a technical solution is achieved in the art by providing a system and method for transmission, reception, and restoration and upscaling of chroma channels decimated by more than one octave. A first color channel processor of a first processing device decimates, by more than one octave, the chroma channels of input images or video by subsampling to create decimated chroma channels. The first color channel processor arranges the full resolution luma channel and decimated chroma channels in different spatial locations of new second images or video such that they do not overlap. The first color channel processor passes the second images or video to an encoder. The encoder passes the encoded the second images or video to a transmitter that transmits the encoded second images or video to a second processing device. The first processing device signals to the second processing device the presence of the decimated chroma channels by any of an in-band or out-of-band signaling method. The second processing device decodes the encoded second images with a standards-based decoder to create decoded second images. A second color channel processor of the second processing device separates the luma and chroma non-overlapping spatial arrangement of the decoded second images into separate channels. The second color channel processor performs a joint-bilateral upsampling of the separated, decimated chroma channels to match the resolution of the separated luma channel, using the separated luma channel as the statistical prior. The joint-bilateral upsampling may comprise octave-by-octave multi-scale joint-bilateral upsampling. The second processing device may further perform a histogram stretch operation upon the restored chroma channels.

The above-described problems are remedied and a technical solution is achieved in the art by providing a system and method for encoding image data. A color channel processor of a first processing device receives a first set of image data comprising one or more chroma channels and a luma channel. The color channel processor reduces the resolution of the one or more chroma channels to produce one or more reduced-resolution chroma channels. The color channel processor arranges the luma channel and the one or more reduced-resolution chroma channels into a second set of image data. The spatial coordinates of the luma channel and the one or more reduced-resolution chroma channels do not overlap in spatial location of the second set of image data. The processing device transmits the second set of image data to a downstream device.

In an example, the first set of image data and the second set of image data may be comprised of a plurality of pixels, each pixel of the plurality of pixels having the one or more chroma channels and the luma channel.

In an example, reducing the resolution of the one or more chroma channels may comprises decimating the one or more chroma channels by at least one octave. In an example, decimating the one or more chroma channels by at least one octave may comprise decimating the one or more chroma channels by more than one octave.

In an example, reducing the resolution of the one or more chroma channels may comprise decimating the one or more chroma channels using a down-sampling method. Decimating the one or more chroma channels using a down-sampling method may comprise decimating the one or more chroma channels by successive application of one-octave down-sampling steps using an interpolation method.

In an example, the processing device may transmit to the downstream device information comprising the extent of reduction of the resolution of the one or more chroma channels of the first set of image data. In an example, the processing device may transmit to the downstream device information comprising the arrangement of the luma channel and the one or more reduced-resolution chroma channels of the second set of image data. The information may comprise an indication that the spatial coordinates of the luma channel and the one or more reduced-resolution chroma channels do not overlap.

In an example, the color channel processor may transmit the second set of image data to an encoder. The encoder is operable to encode the second set of image data using an encoding method. The encoder may transmit the encoded second set of image data to a transmitter. The transmitter may transmit the encoded second set of image data to the downstream device.

The above-described problems are remedied and a technical solution is achieved in the art by providing a system and method for decoding image data. A first processing device receives from a second processing device, a first set of image data comprising one or more chroma channels and a luma channel. The one or more chroma channels are reduced in resolution relative to the luma channel. The first processing device further receives from the second processing device first information comprising the extent of reduction of the resolution of the one or more chroma channels and second information comprising the spatial arrangement of the luma channel and the one or more reduced-resolution chroma channels. A color channel processor of the first processing device reverses the spatial arrangement of the luma channel and the one or more reduced-resolution chroma channels in view of the second information to produce a second set of image data. The color channel processor restores the resolution of the one or more reduced-resolution chroma channels to substantially match the resolution of the separated luma channel in view of the first information to produce a third set of image data. The first processing device transmits the third set of image data to a downstream device.

In an example, the first set of image data, the second set of image data, and the third set of image data are comprised of a plurality of pixels, each pixel of the plurality of pixels having the one or more chroma channels and the luma channel.

In an example, the first information may indicate that the one or more reduced-resolution chroma channels are decimated by at least one octave. In an example, the first information may indicate that the one or more reduced-resolution chroma channels are decimated by more than one octave.

In an example, the second information may indicate that the spatial coordinates of the luma channel and the one or more reduced-resolution chroma channels do not overlap.

In an example, reversing the spatial arrangement of the luma channel and the one or more reduced-resolution chroma channels may comprise separating the luma channel from the one or more reduced-resolution chroma channels in view of the first information.

In an example, restoring the resolution of the one or more reduced-resolution chroma channels to substantially match the resolution of the separated luma channel may comprise performing a joint-bilateral upsampling of the separated, decimated chroma channels to match the resolution of the separated luma channel.

In an example, the separated luma channel may be employed as the statistical prior according to the first information and the second information.

In an example, the joint-bilateral upsampling may be an octave-by-octave multi-scale joint-bilateral upsampling of the separated, decimated chroma channels.

In an example, the color channel processor may perform a histogram stretch operation on the restored one or more chroma channels.

In an example, restoring the resolution may further comprise combining the separated restored one or more chroma channels and the luma channel to produce the third set of image data. The restored third set of image data may be transmitted to a display or a downstream device.

BRIEF DESCRIPTION OF THE DRAWINGS

The present invention may be more readily understood from the detailed description of examples presented below presented below considered in conjunction with the attached drawings and in which like reference numerals refer to similar elements.

Figure 1:
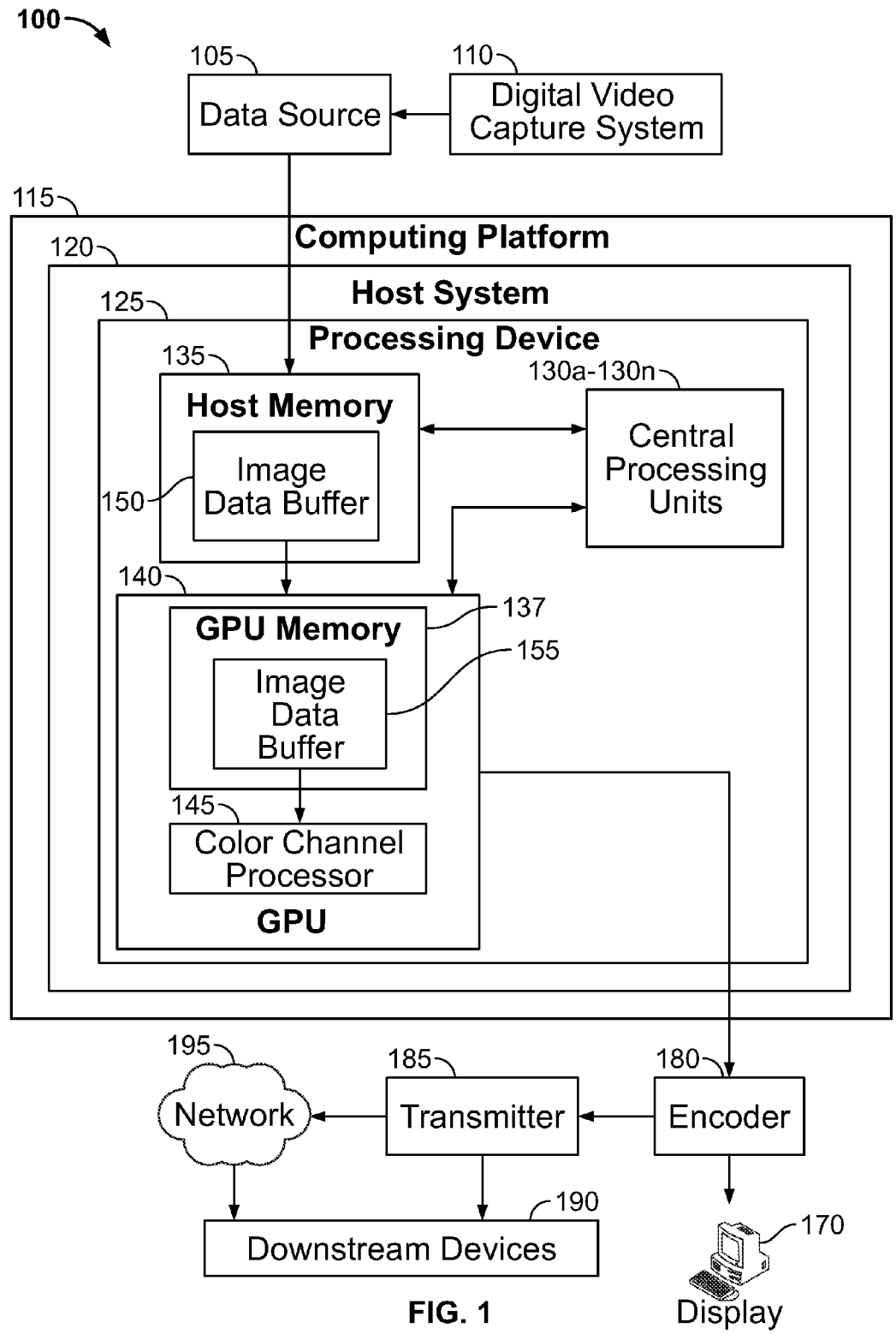
FIG. 1 is a block diagram that illustrates an example computing system in which examples of the present disclosure may operate.

It is to be understood that the attached drawings are for purposes of illustrating the concepts of the invention and may not be to scale.

DETAILED DESCRIPTION

Embodiments of the present disclosure provide a system and method for decimation, transmission, reception, and restoration and upscaling of chroma channels decimated by more than one octave.

In an example, a first color channel processor decimates, by more than one octave, the chroma channels of input images or video by subsampling to create decimated chroma channels. The first color channel processor arranges the full resolution luma channel and decimated chroma channels in different spatial locations of new second images or video such that the full resolution luma channel and decimated chroma channels do not overlap. The first color channel processor passes the second images or video to an encoder. The encoder passes the encoded second images or video to a transmitter, which transmits the encoded second images or video to a downstream device such as a decoder (e.g., over a network). The color channel processor signals first information to the decoder indicating the presence of the decimated chroma channels and signals second information indicating the arrangement of the non-overlapping spatial arrangement of the full resolution luma channel and decimated chroma channels by any of an in-band or out-of-band signaling method.

In another example, the decoder reads or decodes the encoded second images or video with a decoder to create decoded second images. A second color channel processor receives and employs the first information and second information to separate the luma and chroma non-overlapping spatial arrangement of the decoded second images into separate channels. The second color channel processor performs a joint-bilateral upsampling of the separated, decimated chroma channels to match the resolution of the separated luma channel, using the separated luma channel as the statistical prior.

In an example, the joint-bilateral upsampling may comprise octave-by-octave multi-scale joint-bilateral up sampling.

In an example, the second color channel processor may further perform a histogram stretch operation upon the restored chroma channels.

Embodiments of the present disclosure permit a reduction of transmission bandwidth of images and video without introducing visible artifacts. Embodiments of the present disclosure require no changes to the image or video encoders, decoders, or standards thereof. A method for signaling the pre-filtering of an encoder and post-filtering of a decoder to signal the presence and configuration of example systems of the present disclosure is described.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring examples of the present disclosure.

FIG. 1 is a block diagram of an example encoding computing system 100 that decimates the chroma channels of images and video by more than one octave in which examples of the present disclosure may operate. The computing system 100 may receive image data from one or more image data sources 105, such as a video camera or an on-line storage device or transmission medium. The computing system 100 may also include a digital video or image capturing system 110 and a computing platform 115. The digital video or image capturing system 110 may process the image data. In an example, the image data may comprise one or more still images, streams of digital video, or analog video to digital video converted to a form which can be processed by the computing platform 115 as the one or more image data sources 105. The computing platform 115 may comprise a host system 120, which may comprise, for example, a processing device 125, such as one or more central processing units 130a-130n. The processing device 125 may be coupled to a host memory 135. The host memory 135 may store the image data received from the one or more data sources 105 in an image data buffer 150.

The processing device may further implement a graphics processing unit 140 (GPU). It will be appreciated by those skilled in the art that other co-processor architectures may be utilized besides GPUs, such as, but not limited to, DSPs, FPGAs, or ASICs, or adjunct fixed-function features of the processing device 125 itself. It will further be appreciated by those skilled in the art that the GPU 140 may be collocated on the same physical chip or logical device as the central processing units 130a-130n, also known as an accelerated processing unit ("APU"), as may be found in mobile phones and tablets. Separate GPU and CPU functions may be found in computer server systems where the GPU is a physical expansion card, and personal computer systems and laptops. The GPU 140 may comprise a GPU memory 137. It will be appreciated by those skilled in the art that the host memory 135 and GPU memory 137 may also be collocated on the same physical chip(s) or logical device, such as on an APU.

The processing device 125 may be configured to implement a color channel processor 145 to receive the image data from the data source 105, and to receive the image data buffer 150, which may be transferred to the GPU memory 137 as image buffer 155. In one example, the processing device 125 may implement the color channel processor 145 as a component of the GPU 140. In an example, the color channel processor 145 may be configured to decimate the chroma channels of the image buffer 155 and spatially re-arrange the decimated chroma and luma channels of the image buffer 155 to produce converted image data.

In one example, the converted image data may be displayed on a display 170. In another example, the color channel processor 145 may transmit the converted image data to the encoder 180. In one example, the encoder 180 may encode the converted image data using an encoding method known in the art. The encoder 180 may convey the encoded data to a transmitter 185, which transmits the encoded data to one or more downstream devices 190 directly or through a network 195. In one example, one or both of the encoder 180 or the transmitter 185 may be external to the processing device 125 or the computing platform 115. In another example, one or both of the encoder 180 or the transmitter 185 may be integrated with the processing device 125 or the computing platform 115.

Figure 2:
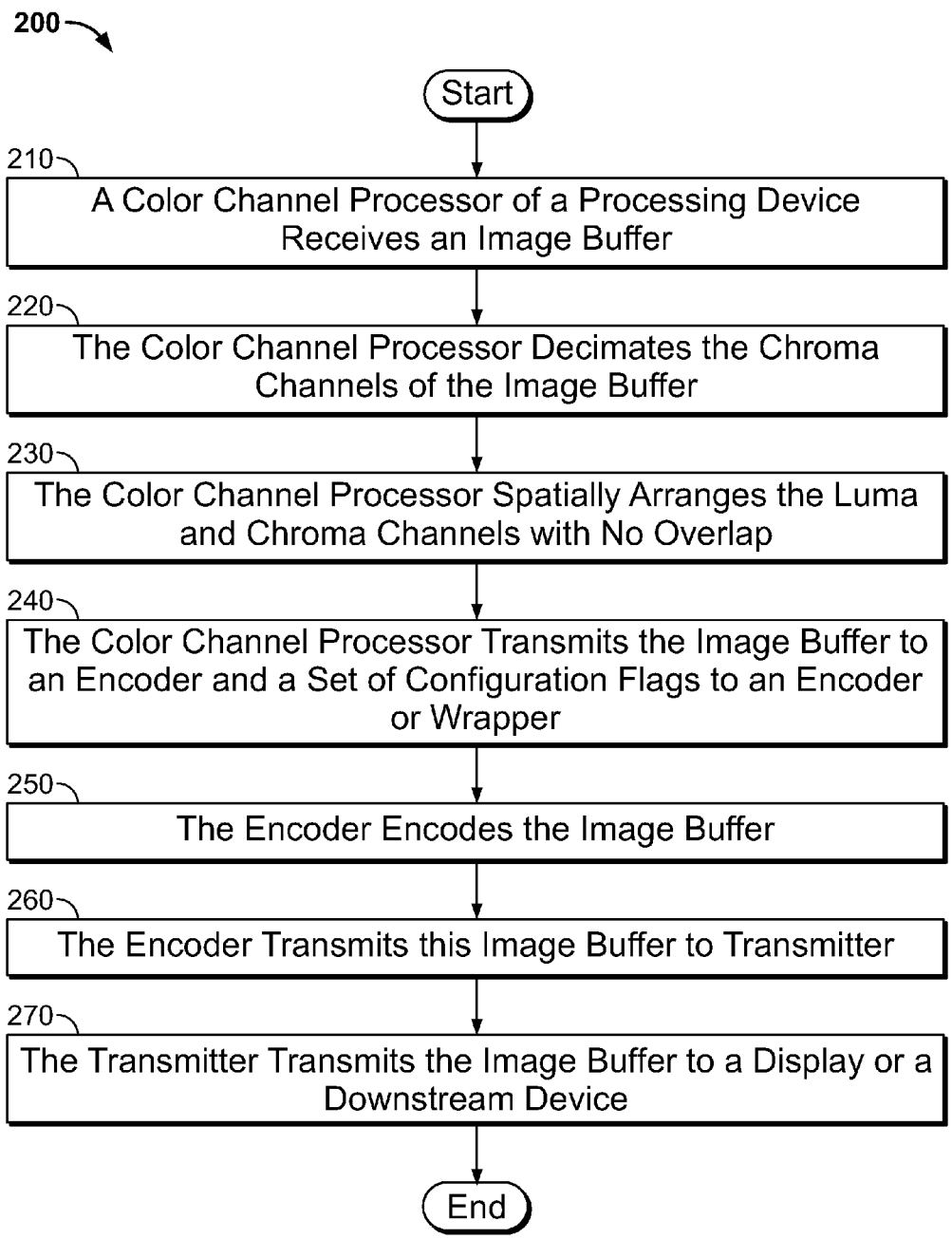
FIG. 2 is a flow diagram illustrating an example of an encoding method associated with the encoding computing system of FIG. 1.

FIG. 2 is a flow diagram illustrating an example of an encoding method for decimation of the chroma channels of image data (e.g., digital still images or video) by one or more octaves. The method 200 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 200 may be performed primarily by the color channel processor 145 of the computing system 100 of FIG. 1.

As shown in FIG. 2, to permit the computing system 100 to encode image data, at block 210, the color channel processor 145 may receive a first set of image data from an image buffer 155. The one or more pixels of the first set of image data in the image buffer 155 may comprise a plurality of pixels, wherein each pixel comprises a luma channel and one or more color channels. At block 220, the color channel processor 145 may reduce the resolution of the one or more color channels of the image data in the image buffer 155. In an example, the color channel processor 145 may reduce the resolution of the one or more color channels of the image data in the image buffer 155 by decimation by at least one octave (e.g., one or more octaves). In another example, the color channel processor 145 may reduce the resolution of the one or more color channels of the image data in the image buffer 155 by decimation by more than one octave.

In an example, the color channel processor 145 may reduce the resolution of the one or more chroma channels by decimating the one or more chroma channels using a down-sampling method. In an example, the down-sampling method may comprise successive application of one-octave down-sampling steps using an interpolation method such as Lanczos interpolation, bicubic interpolation, or bilinear interpolation. In another example, the color channel processor 145 may perform decimation in a single step using an interpolation method such as Lanczos interpolation or bicubic interpolation.

At block 230, the color channel processor 145 may arrange the luma channel and the one or more reduced-resolution chroma channels into a second set of image data in the image buffer 155 such that spatial coordinates of the luma channel and the one or more reduced-resolution chroma channels do not overlap in spatial locations of the second set of image data. The one or more pixels of the second set of image data in the image buffer 155 may comprise a plurality of pixels, each pixel of the plurality of pixels having the one or more chroma channels and the luma channel.

As used herein, a wrapper may refer to a term used in the sense of the SMPTE definition of video file formats, wherein the "essence" describes the codec payload and its contents, and the "wrapper" describes the file format or transmission format or other payload packaging for the essence. As will be appreciated by those skilled in the art, a wrapper may also refer to a file format for a single image, such as the JFIF, which describes the standard way JPEG images are to be encapsulated into files.

At block 240, the color channel processor 145 may transmit the second set of image data in the image buffer 155 to an encoder 180 (or wrapper). At block 250, the encoder 180 may encode the second set of image data in the image buffer 155. At block 260, the encoder 180 may transmit the encoded second set of image data to a transmitter 185. At block 270, the transmitter 185 may transmit the encoded second set of image data (e.g., the non-overlapping image data in image buffer 155) to one or more of a display 170 or one or more downstream devices 190. In one example, the transmitter 185 may transmit the image buffer 155 to the one or more downstream devices 190 (e.g., a second processing device (e.g., to an encoder 180, multiplexer, a wrapper, or a display 170)) through a network 195.

In an example, the color channel processor 145 may further transmit a set of configuration flags to the downstream device 190. In an example, the configuration flags may convey the extent of reduction of the resolution of the one or more chroma channels of the first set of image data. The extent of reduction of the resolution of the one or more chroma channels of the first set of image data may comprise the extent of decimation (e.g., by one or more octaves) of the first set of image data in the image buffer 155 by the color channel processor 145.

In an example, the configuration flags may further convey information comprising the spatial arrangement of the luma channel and the one or more reduced-resolution chroma channels of the second set of image data in the image buffer 155 employed by the color channel processor 145. The information may comprise an indication that the spatial coordinates of the luma channel and the one or more reduced-resolution chroma channels do not overlap (e.g., information comprising the specific re-arrangement of the luma channels and chroma channels of the decimated image data such that the luma channels and chroma channels do not overlap).

Figure 3:
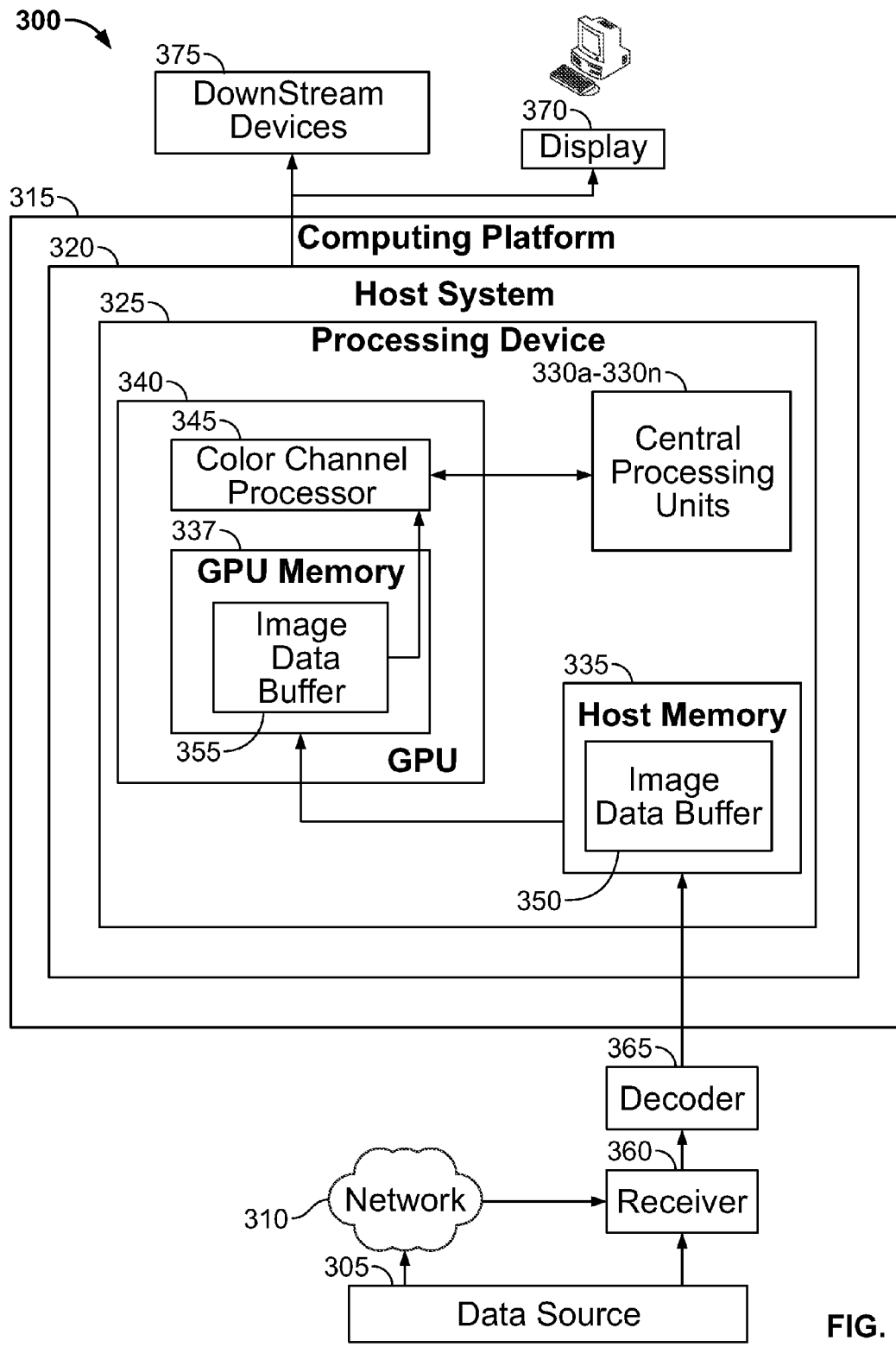
FIG. 3 is a block diagram that illustrates an example of a decoding computing system in which examples of the present disclosure may operate.

FIG. 3 is a block diagram of an example decoding computing system 300 that receives, restores and upscales chroma channels of encoded image data (e.g., digital still images or video) that has been decimated by one or more octaves in which examples of the present disclosure may operate. In an example, the computing system 300 may be configured to receive encoded image data from one or more data sources 305. The one or more data sources 305 may be the encoding computing system 100 of FIG. 1. The computing system 300 may also include a computing platform 315. The computing platform 315 may comprise a host system 320, which may comprise, for example, a processing device 325, such as one or more central processing units 330a-330n. The processing device 325 is coupled to a host memory 335. The host memory 335 may store the encoded image data (e.g., digital image or video data) received from the one or more data sources 305 in an image data buffer 350. The encoded image data may be received by a receiver 360, decoded by a decoder 365, and passed to an image data buffer 350. The receiver 360 may receive the encoded image data either directly from the one or more data sources 305 or over a network 310. In one example, one or both of the receiver 360 or the decoder 365 may be external to the processing device 325 or the computing platform 315. In another example, one or both of the receiver 360 or the decoder 365 may be integrated with the processing device 325 or the computing platform 315.

The processing device 325 may further implement a graphics processing unit 340 (GPU). It will be appreciated by those skilled in the art that other co-processor architectures may be utilized besides GPUs, such as, but not limited to, DSPs, FPGAs, or ASICs, or adjunct fixed-function features of the processing device 325 itself. It will further be appreciated by those skilled in the art that the GPU 340 may be collocated on the same physical chip or logical device as the central processing units 330a-330n, also known as an "APU", such as found on mobile phones and tablets. Separate GPU and CPU functions may be found on computer server systems where the GPU is a physical expansion card, and personal computer systems and laptops. The GPU 340 may comprise a GPU memory 337. It will be appreciated by those skilled in the art that the host memory 335 and GPU memory 337 may also be collocated on the same physical chip(s) or logical device, such as on an APU. It will further be appreciated by those skilled in the art that the decoding processing device 325 may be partially or wholly integrated with the encoding processing device 125 into the computing system 100 of FIG. 1 to provide both encoding and decoding functionality.

The processing device 325 may be configured to receive the encoded image data, and a set of configuration flags (e.g., the configuration flags employed in the encoding system 100 of FIG. 1) from the data source 305 through the receiver 360. The processing device 325 may be configured to transfer the set of configuration flags and create the image data buffer 350 based on the received encoded image data to a decoder 365 to decode the image data buffer 350 and the set of configuration flags. The decoder 365 may be configured to transfer the image data buffer 350 and the set of configuration flags to the GPU memory 337 as an image data buffer 355.

The processing device 325 may be configured to implement a color channel processor 345 to receive the image data buffer 355 and the set of configuration flags from the decoder, demultiplexer, or unwrapper. In one example, the processing device 325 may implement the color channel processor 345 as a component of the GPU 340.

The color channel processor 345 may be configured to reverse the spatial arrangement (e.g., the spatial arrangement employed in the encoding system 100 of FIG. 1) by separating the luma and chroma non-overlapping spatial arrangement of the decoded second images into separate channels according to the set of configuration flags. The color channel processor 345 may be configured to perform a joint-bilateral upsampling of the separated, decimated chroma channels to match the resolution of the separated luma channel, using the separated luma channel as the statistical prior according to the set of configuration flags. In an example, the color channel processor 345 may be configured to perform an octave-by-octave multi-scale joint-bilateral upsampling of the separated, decimated chroma channels to match the resolution of the separated luma channel. In an example, the color channel processor 345 may be configured to perform a histogram stretch operation on the restored chroma channels. The color processor may combine the separated channels into restored image data in an image data buffer 355, suitable for display output on a display 370 or for transmission to one or more downstream devices 375 (e.g., an encoder).

Figure 4:
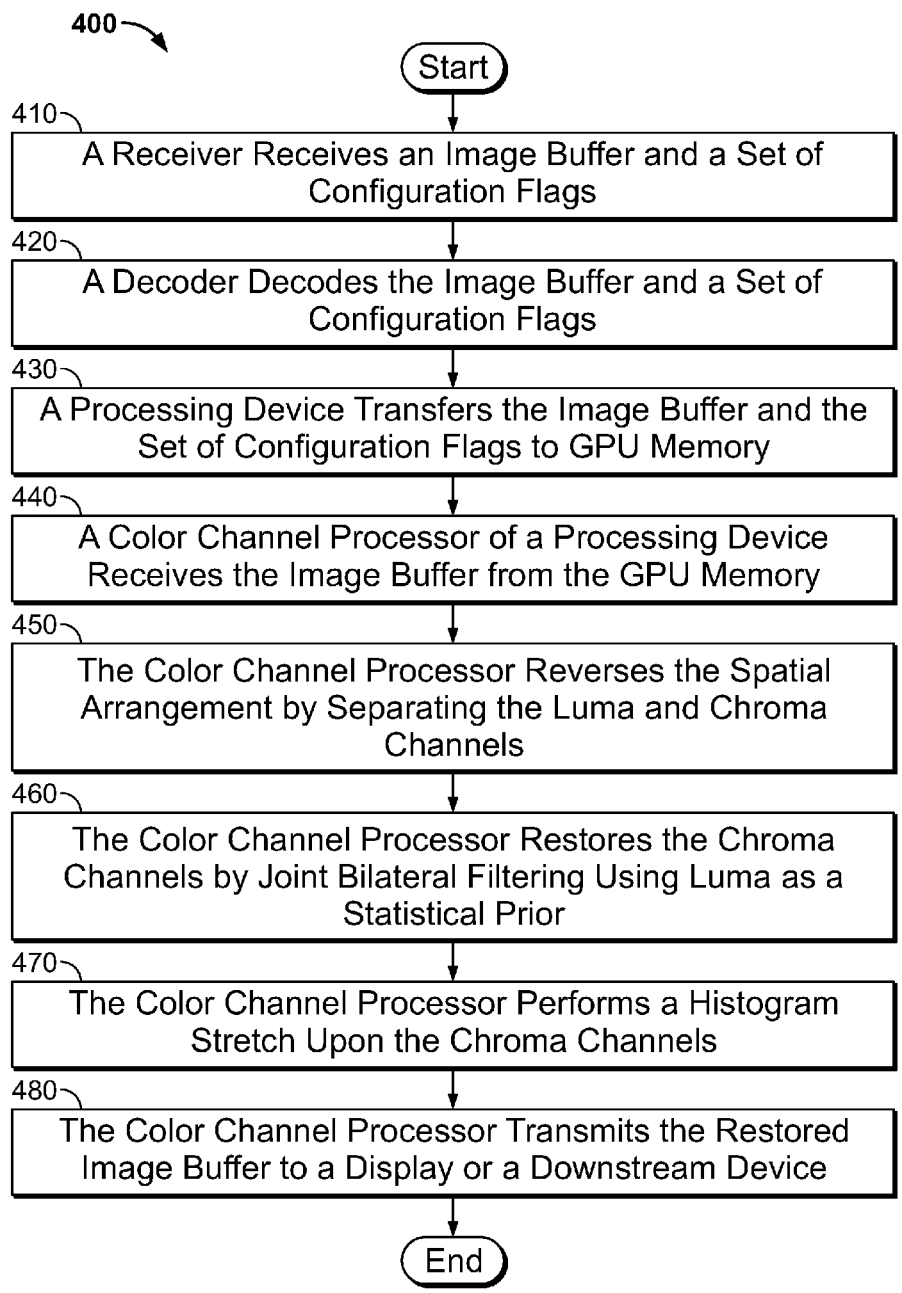
FIG. 4 is a flow diagram illustrating an example of a decoding method associated with the encoding computing system of FIG. 3.

FIG. 4 is a flow diagram illustrating an example of a decoding method 400 for receiving, restoration and upscaling chroma channels of image data (e.g., digital still images or video) decimated by one or more octaves. The method 400 may be performed by the computer system 300 of FIG. 3 and may comprise hardware (e.g., circuitry, dedicated logic, programmable logic, microcode, etc.), software (e.g., instructions run on a processing device), or a combination thereof. In one example, the method 300 may be performed primarily by the color channel processor 345 of the computing system 300 of FIG. 3.

As shown in FIG. 4, to permit the computing system 300 to decode image data, at block 410, a receiver 360 receives encoded image data and a set of configuration flags from the data source 305 in an image data buffer 350. The encoded image data may comprise one or more chroma channels and a luma channel, wherein the one or more chroma channels are reduced in resolution relative to the luma channel. The encoded image data in the image data buffer 350 may comprise a plurality of pixels, wherein each pixel comprises a luma channel and one or more color channels.

In an example, the configuration flags may convey first information comprising the extent of reduction of the resolution of the one or more chroma channels and second information comprising the spatial arrangement of the luma channel and the one or more reduced-resolution chroma channels. In an example, the first information may indicate that the one or more reduced-resolution chroma channels are decimated by at least one octave. In an example, the first information may indicate that the one or more reduced-resolution chroma channels are decimated by more than one octave. In an example, the second information may convey the spatial arrangement (e.g., the re-arrangement of the luma channels and chroma channels of the decimated image data such that the luma channels and chroma channels do not overlap) of the image received from the data source 305.

At block 420, a decoder 365 decodes the image data and the set of configuration flags, and places the decoded image data in the image data buffer 350 of the processing device 325. At block 430, the processing device 325 transfers the decoded image data buffer 350 and the set of configuration flags to GPU image data buffer 355 of the GPU memory 337. At block 440, the color channel processor 345 receives the image data buffer 355 and the set of configuration flags from GPU memory 337. The decoded image data in the image data buffer 355 may comprise a plurality of pixels, wherein each pixel comprises a luma channel and one or more color channels.

At block 450, the color channel processor 345 reverses the spatial arrangement of the luma channel and one or more color channels of the plurality of pixels of the image data in the image data buffer 355 (e.g., the spatial arrangement employed in the encoding system 100 of FIG. 1) in view of the second information to produce a second set of image data. In an example, the color channel processor 345 may reverse the spatial arrangement of the luma channel and one or more color channels by separating the luma and chroma non-overlapping spatial arrangement of the decoded image data in view of the set of configuration flags into a separate luma channel and one or more chroma channels.

At block 460, the color channel processor 345 restores the resolution of the one or more reduced-resolution chroma channels to substantially match the resolution of the separated luma channel in view of the first information to produce a third set of image data in the image data buffer 355. In an example, the color channel processor 345 may perform an octave-by-octave multi-scale joint-bilateral upsampling of the one or more color channels of the image data in the image data buffer 355 to match the resolution of the separated luma channel of the image data in the image data buffer 355, using the separated luma channel of the image data buffer 355 as the statistical prior according to the set of configuration flags.

In an example, restoring the resolution of the one or more reduced-resolution chroma channels to substantially match the resolution of the separated luma may further comprise the color channel processor 345 combining the separated restored one or more chroma channels and the luma channel to produce the third set of image data in the image data buffer 355. The third image data in the image data buffer 355 may comprise a plurality of pixels, wherein each pixel comprises a luma channel and one or more color channels.

At block 470, the color channel processor 345 may perform a histogram stretch operation upon the restored one or more chroma channels of the image data in the image data buffer now suitable for display output on a display 370 or for transmission to one or more downstream devices 375 (e.g., an encoder through the network 310).

At block 480, the color space processor 345 may transmit the restored image data to a display 370 or a downstream device 375.

In one example, the set of configuration flags may be received in-band or out-of-band with the image data in the image data buffer 350 from the data source 305 (e.g., the computing system 100 of FIG. 1).

Figure 5:
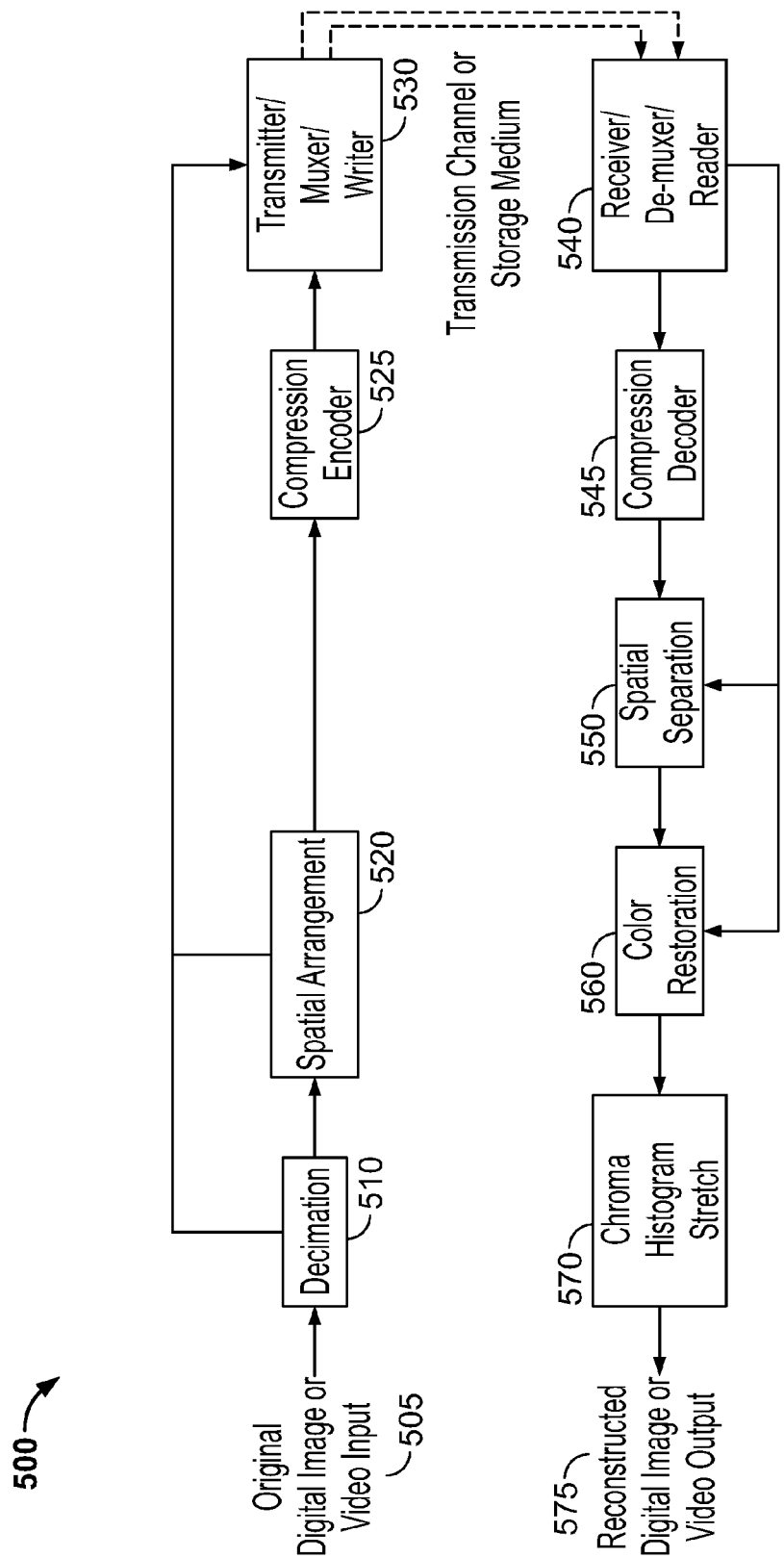
FIG. 5 is a block diagram of an example implementation of the computing systems of FIGS. 1 and 3 working in conjunction.

FIG. 5 is a block diagram of an example implementation 500 of the computing systems 100, 300 of FIGS. 1 and 3 working in conjunction. The example implementation 500 of the computing systems 100, 300 of FIGS. 1 and 3 comprise an implementation in hardware (e.g., circuitry, dedicated logic, programmable logic, microcode, etc.), software (e.g., instructions run on a processing device), or a combination thereof.

As shown in FIG. 5, an original digital image or video 505 may be input to a first color channel decimation process 510. In an example, the luma channels are not decimated, only the color channels. In an example, the digital image or video 505 may be in the YCbCr color format, and only the CbCr channels are decimated. The extent of the decimation applied forms the first part of a set of configuration flags.

The decimation process 510 outputs the luma and the decimated chroma channels to spatial arrangement process 520.

Figure 6:
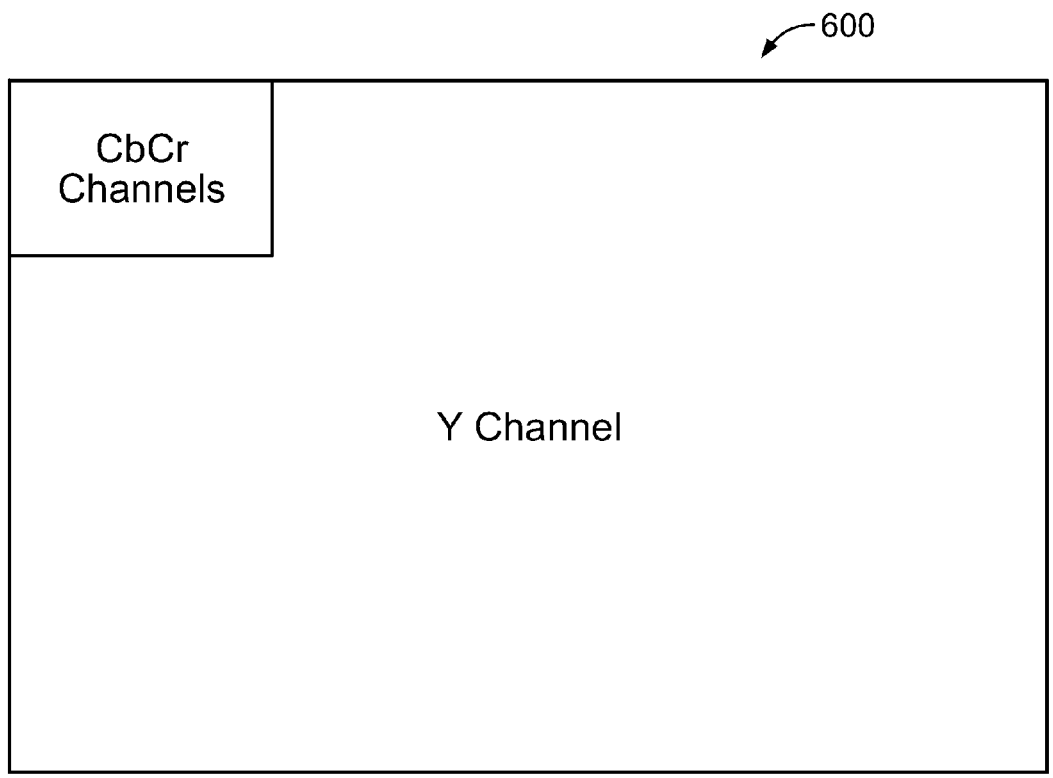
FIG. 6 shows an arrangement of the full-resolution luma channel and the two-octave decimated chroma channels are co-mingled in the same spatial extents (prior art).

FIG. 6 shows an arrangement 600 of the full-resolution luma channel and the two-octave decimated chroma channels that are co-mingled in the same spatial extents. When the encoder only supports one-octave decimation of the chroma channels, the only way to transmit chroma channels decimated by more than one octave is to embed them as a smaller portion of the one-octave decimated chroma channels. FIG. 6 shows the decimated CbCr chroma channels embedded in the top left eighth of the frame extent.

Figure 7:
FIG. 7 shows shadow artifacts introduced by co-mingling luma with chroma channels decimated by more than one octave (prior art).

FIG. 7 shows bleeding and shadow artifacts after decoding and restoration that may result if no spatial arrangement process as shown in block 520 of FIG. 5 is performed and the arrangement of FIG. 6 is employed. Note that the cones of the full range image have smaller shadow duplicates in the circled area. This is a consequence of co-mingled chroma channels having a mismatch in resolution with the luma channel. Additionally, this arrangement imposes a penalty on most modern encoders, since the expectation of these encoders is that the chroma and luma are matched in resolution (or at least chroma is signaled as decimated by one octave) such that the motion estimation may employ all three channels of data to perform block matching. The lack of such correspondence results in the encoder generating many more motion vector errors, which in turn increases the need to encode more error residual data.

Figure 8:
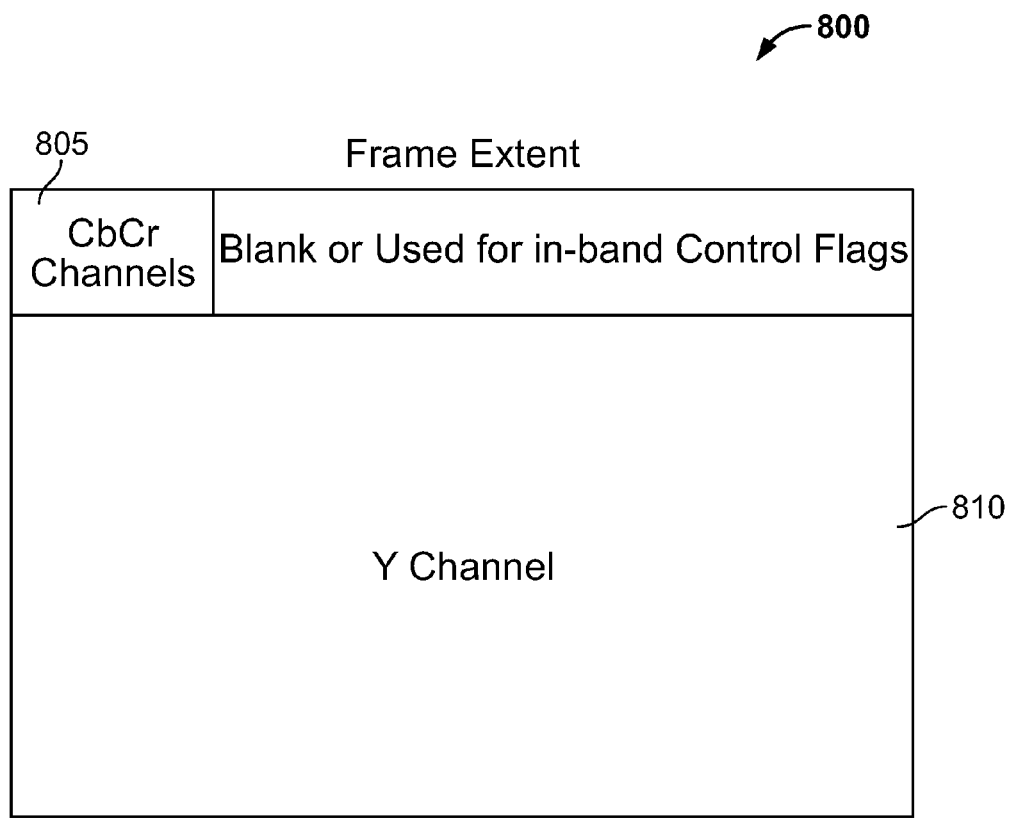
FIG. 8 shows a disclosed spatial arrangement of a luma channel and chroma channels sub sampled by more than one octave.

FIG. 8 is a diagram of one example 800 of the result of the spatial arrangement process 520 of FIG. 5, wherein the spatial arrangement process 520 places the chroma channels in the top left image coordinates 805 (e.g., the chroma quadrant 805), and places the luma channel shifted down by the extent of the chroma vertical resolution (e.g., in the luma quadrant 810). This arrangement prevents the luma channel and chroma channels, which are mismatched in resolution, from suffering from bleeding or shadow artifacts. It should be to noted that the arrangement of FIG. 8 includes luma data in the chroma quadrant 805, and chroma data in the luma quadrant 810. In the case of the chroma quadrant 805, it is necessary to set the unsigned luma channel pixel values to center or midrange (such as 127 in the case of an 8-bit color depth), and not zero; otherwise, the encoder will penalize the chroma quadrant 805 with aggressive quantization, since the encoder will interpret the chroma quadrant 805 as containing exceptionally dark colors. In the case of the luma quadrant 810, it is important to ensure that the signed chroma channel pixel values are zeroed out. In this way, the luma quadrant 810 is interpreted by the encoder as containing greyscale data. An advantage of the arrangement of FIG. 8 is that it permits in-band signaling of the configuration flags by setting macroblock color values in the blank area that will survive the encoding and decoding processes. It will be appreciated by those skilled in the art that many such arrangements are possible.

Figure 9:
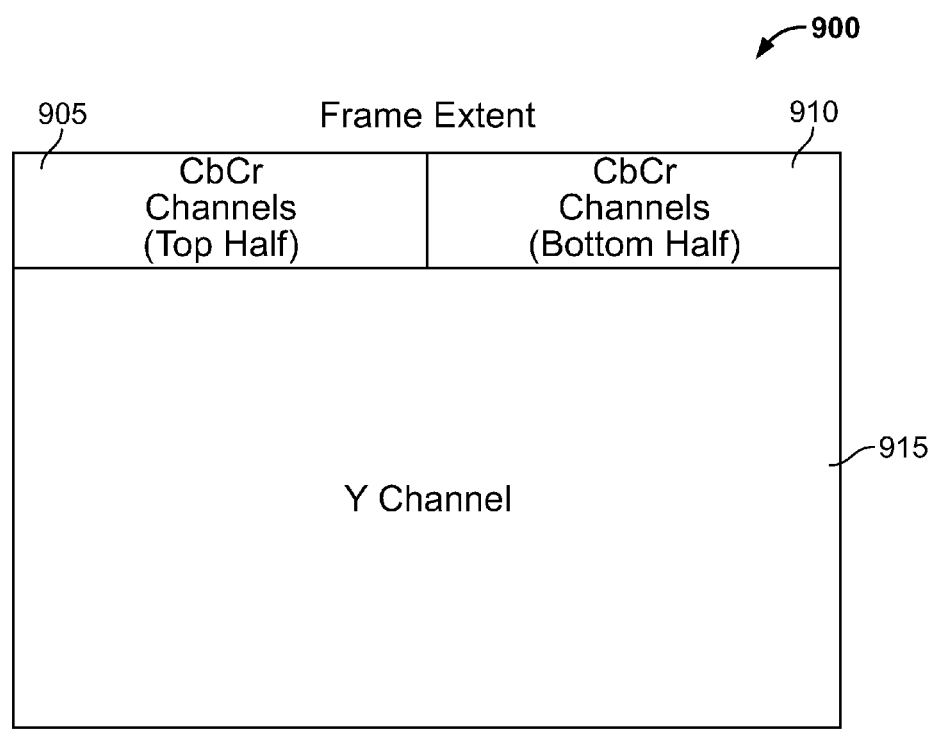
FIG. 9 shows a disclosed spatial arrangement of a luma channel and chroma channels subsampled by more than one octave which allows for more efficient usage of the available frame extent.

FIG. 9 shows another example of a spatial arrangement 900 which permits more efficient usage of the available frame area. The only requirement to satisfy and to prevent eventual artifacts is to ensure that the spatial extent of the luma channel and the chroma channels do not overlap. FIG. 9 includes luma data in the chroma quadrants 905, 910, and chroma data in the luma quadrant 915. In the case of the chroma quadrants 905, 910, it is necessary to set the unsigned luma channel pixel values to center or midrange (such as 127 in the case of an 8-bit color depth), and not zero, otherwise the encoder will penalize the chroma quadrants 905, 910 with aggressive quantization, as the encoder will interpret the chroma quadrants 905, 910 as containing exceptionally dark colors. In the case of the luma quadrant 915, it is important to ensure that the signed chroma channel pixel values are zeroed out. In this way, the luma quadrant 915 is interpreted by the encoder as containing greyscale data.

The spatial arrangement process 520 outputs the image or video data to an encoder 525, and conveys the set of configuration flags to either the encoder 525 or directly to a transmitter/muxer/writer 530. It will be appreciated by those skilled in the art that in many cases the file format encapsulation or stream muxing process may be co-located with the encoder 525. Additionally, the set of configuration flags may be conveyed to the encoder 525 or transmitter/muxer/writer 530 so that they are communicated to a downstream receiver/demuxer/reader process 540, and do so in such a way to not require a custom implementation of the encoder 525, a decoder 545, the transmitter/muxer/writer 530, or the receiver/demuxer/reader 540 processes. As is well-known in the art, file and stream formats offer a variety of ways to accomplish this.

In an example, the JPEG File Interchange Format (hereinafter, JFIF) may be employed to encapsulate JPEG compressed imagery, and JFIF specifies well-known metadata extensions in many formats including EXIF, ICC profile, and Picture Info, any of which may be employed to convey the set of configuration flags.

In an example, H264 encoded bitstreams support the inclusion of optional supplemental enhancement information (SEI) headers, in which may be embedded the set of configuration flags. These methods require no changes to the encoder (or decoder) processes 525, 545, but simply the ability to output these values to either the encoder 525 or the transmitter/muxer/writer 530, and concomitantly to query these values from the downstream decoder 545 or the receiver/demuxer/reader 540.

Other ways to convey the set of configuration flags are not coupled to the coder or codec format at all, but to the transport stream itself. In examples, these include the ES Descriptor of MPEG Transport streams, which may be employed for the purposes described herein, and also via RTP extension headers.

It will be appreciated by those skilled in the art that while many conveyance methods for the set of configuration flags are possible, desirable characteristics of the conveyance methods may include independence of an encoder and a decoder implementation, and access to the conveyed set of configuration flags via API or other methods by processes external to the encoders, decoders, transmitters, receivers, muxers, demuxers, readers and writers. This may also include completely out-of-band conveyance, such as standardization of particular encoders and decoders upon values of the set of configuration flags, or communication of these values by other channels and contexts, such as by the manifest files of MPEG-DASH or HLS streams, or by separate files or protocols by way of non-limiting examples.

Along with the compressed image or video data itself, the set of configuration flags may optionally be transmitted or communicated from the upstream transmitter/muxer/writer 530 via a transmission channel 535 or storage medium to the downstream receiver/demuxer/reader 540 which de-encapsulates the image or video data into a form suitable for the decoder 545, and which outputs the data to a spatial separation process 550.

The spatial separation process 550 reverses the spatial arrangement process 520 and outputs the data to a color restoration process 560.

The advantage of decimating and then restoring the chroma channels is the significant reduction of data to encode, transmit, and decode. Since the HVS resolution sensitivity to brightness is over twice that of color, a well-known and common standard transmission and reception method is YCbCR 4:2:0 subsampling, which decimates the color channels by one octave. This matches the HVS's differing sensitivities to brightness and color spatial resolution.

Figure 10:
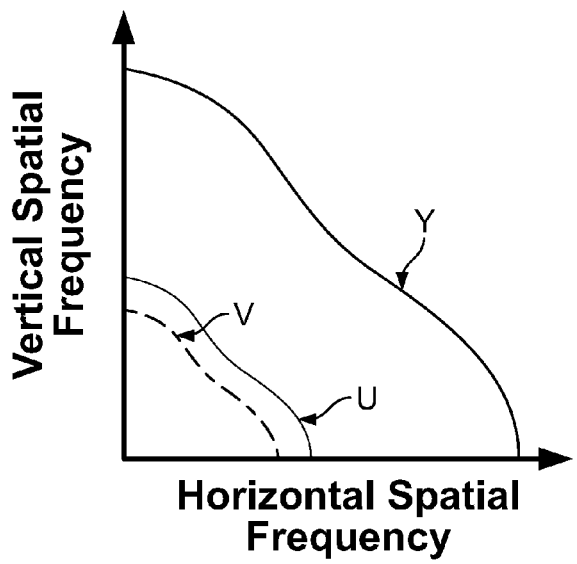
FIG. 10 shows the spatial resolution sensitivity of the HVS for both brightness and color.

FIG. 10 shows the spatial resolution sensitivity of the HVS for both brightness and color. Decimating the color channels by one octave (or reducing the vertical and horizontal resolution by half) safely matches the sensitivity of the HVS in normal viewing conditions.

However, decimating by more than one octave without a restoration process more sophisticated than upsampling by a linear sampler such as Bicubic or Lanzcos results in objectionable artifacts and image quality degradation.

Figure 11:
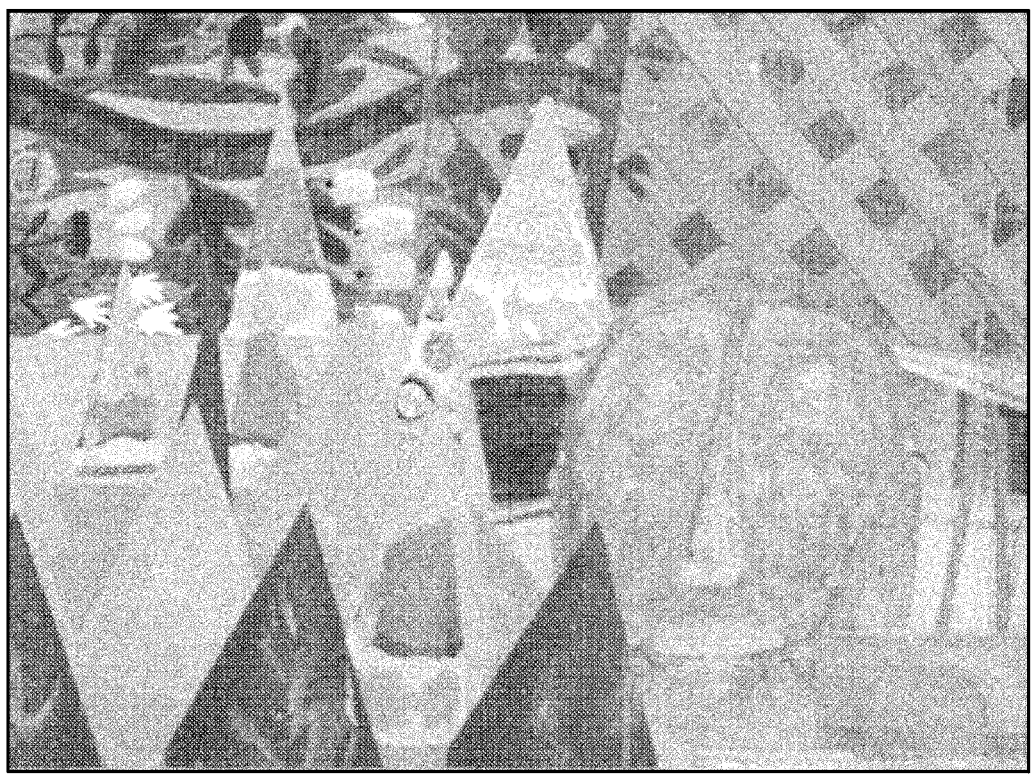
FIG. 11 shows an original full resolution Cb channel.

FIG. 11 shows an original full resolution Cb channel.

Figure 12:
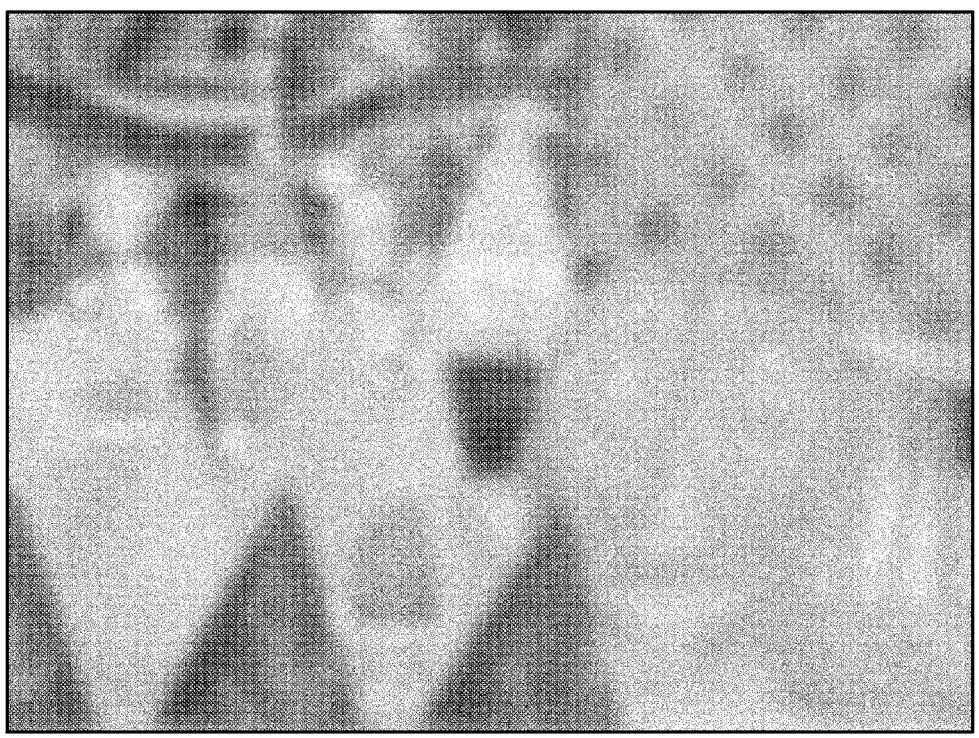
FIG. 12 shows color bleed in the Cb channel introduced by prior art chroma upscaling processes when used with chroma channels decimated by more than one octave (prior art).

FIG. 12 shows color bleed in the Cb channel introduced by prior art chroma upscaling processes when used with chroma channels decimated by more than one octave. The overall effect of blurring evident in the figure results in the cones' red and green colors to bleed into the background, and vice-versa.

A solution to this problem is to employ either joint-bilateral filtering and upscaling, or a multi-scale octave-by-octave joint bilateral filtering and upscaling.

Figure 13:
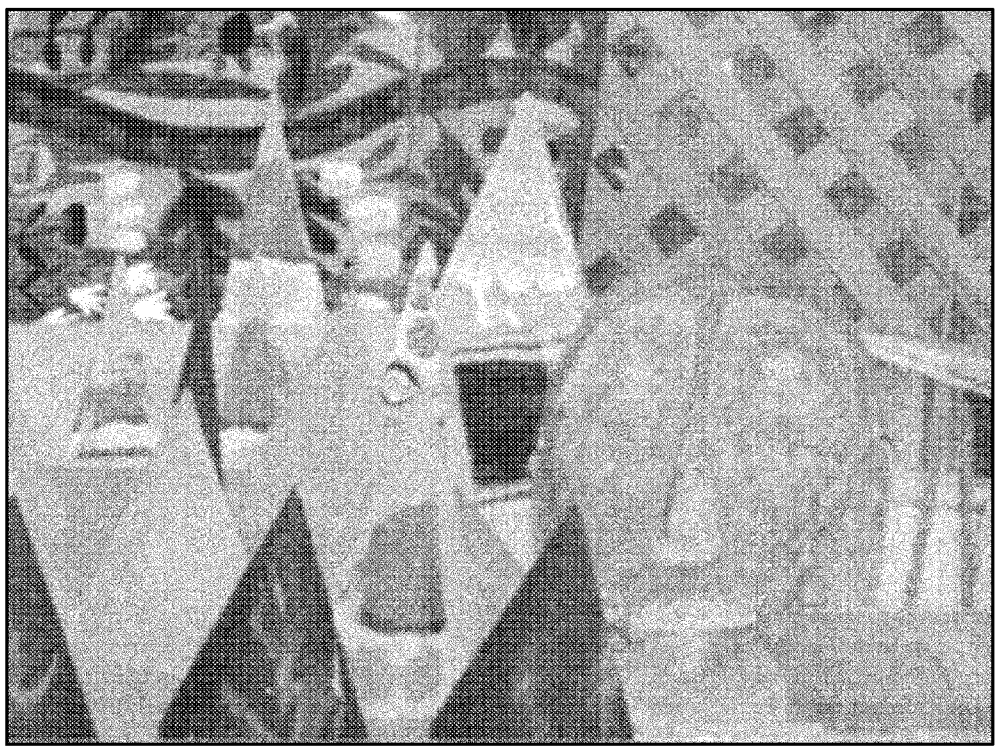
FIG. 13 shows restoration of the Cb channel by example of the present disclosure.

FIG. 13 shows restoration of the color channels by example of the present disclosure.

The multi-scale joint-bilateral filter described herein differs from the well-known bilateral filter and joint-bilateral filter in several significant ways. A normal bilateral filter as defined in Equations 1 and 2 below calculates filter weights adaptively by spatial distance constituting a range, and radiosity distance constituting a domain within an image under analysis to drive weighting. More particularly, for input image Z, output image Z', and window of support Ω, a typical bilateral filter is defined as follows in Eq. 1:

Eq. 1

$$z'_x = \frac{\sum_{\xi \in \Omega} g(\xi - x) r(Z_\xi - Z_x) Z_\xi}{\sum_{\xi \in \Omega} g(\xi - x) r(Z_\xi - Z_x)}$$

where g is a Gaussian spatial weighting function, and r is a radiosity weighting function. Typical values for radiosity include luminance or intensity of the constituent pixel samples. System input is typically supplied by constant factors $\sigma_s$ and $\sigma_r$ that modify the g and r functions as in Eq. 2 and 3:

$$g(\xi - x) = e^{-0.5 \left( \frac{\|\xi - x\|}{\sigma_s} \right)^2} \quad \text{Eq. 2}$$

$$r(\xi - x) = e^{-0.5 \left( \frac{|Z(\xi) - Z(x)|}{\sigma_r} \right)^2} \quad \text{Eq. 3}$$

The radiosity function r for the radiosity domain is defined by Eq. 3 above. Eq. 2 defines spatial weighting in the function g.

In comparison, instead of only employing radiosity (or luminance) to guide the weighting of the filter, the joint-bilateral filter performs filtering on a first image domain, while being guided by the weighting of a second domain. For joint-bilateral filtering in the sense intended in the present disclosure, radiosity weighting may be defined by Eqs. 4-5 and its accompanying description hereinbelow.

Smaller values of factors $\sigma_s$ and $\sigma_r$, increase the locality and similarity of spatial and radiosity weighting contributions, respectively. The L1 distance measure in the denominator of the exponential of radiosity function r is appropriate for images where only luminosity or intensity is enough to differentiate edges and boundary locality sufficiently. In an example, the first domain, being filtered, is jointly the Cb and Cr, or like color channels.

In an example, a second image radiosity domain is provided by a second input of the luma channel, as function d in Eq. 4:

$$Z'_x = \frac{\sum_{\xi \in \Omega} g(\xi - x) r(Z_\xi - Z_x) d(Y_\xi - Y_x) Z_\xi}{\sum_{\xi \in \Omega} g(\xi - x) r(Z_\xi - Z_x) d(Y_\xi - Y_x)} \quad \text{Eq. 4}$$

where the new second domain radiosity function d is defined by Eq 5:

$$d(\xi - x) = e^{-0.5 \left( \frac{\tilde{e}(Y(\xi) - Y(x))}{\sigma_d} \right)^2} \quad \text{Eq. 5}$$

and the function d measures differences of luma. Formally, when the luma is sampled at a different, higher resolution than the chroma channels, this is more properly known as a joint-bilateral upsampling process rather than a filtering process. Subsequent iterations of the joint-bilateral upsampling process at the new, upsampled resolution would be considered filtering. The overall effect of application of the filter is that the second domain guides the filtering of the first domain; the second domain known as the "statistical prior".

The multiscale variant of joint-bilateral filtering in the present disclosure works one or more octaves at a time, or even partial-octaves at a time; in the manner of a first joint bilateral upsampling to the next higher resolution, subsequent iterations of joint bilateral filtering, followed by a subsequent second bilateral upsampling, and filtering until the final resolution for the Cb Cr or color channels is reached. The effect of this arrangement is a vast reduction in computational complexity; with the multiscale approach, modest regions-of-support for the sampling process may be employed, such as 5×5, to achieve good results, while the monolithic, non-multi-scale approach requires much larger regions of support and potentially many more iterations of the filtering process to converge to an acceptable result.

The color restoration process 560 outputs the restored chroma channels of the reconstructed digital image or video 575 to an optional histogram process 570. For highly saturated portions of the image, such as brightly colored logos, the color restoration process 560 may not be enough to restore the original high chroma values and energy present in the original input images. In such circumstances, a histogram stretch function may be employed. The histogram stretch function may employ techniques as disclosed in U.S. Pat. No. 8,704,842, or manipulate the first and second received values of a perceptual color based reception system as taught in co-pending U.S. patent application Ser. No. 14/032,640, thereby avoiding the need for histogram computation, the disclosures of which are incorporated by reference herein in their entirety.

The pre-encoding process of examples of the present disclosure is efficient enough to perform in greater-than-realtime for 4K video resolution video at 30 fps on contemporaneous, commercial, mass-marketed computer hardware, and multiple images and video at a variety of resolutions in real-time and near-real-time. The post-decoding process of embodiments of the present disclosure is efficient enough to perform on any end-user device with a GPU, CPU, or APU at full HD resolutions for single instances of video and images, such as feature phones, smart phones, tablets, laptops, PCs, set-top boxes, and televisions.

This combination of efficiencies at both the encoder proximity and decoder proximity according to examples of the present disclosure opens up new applications. These applications include, but are not limited to, real-time improved perceptual quality and/or improved video coder efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core.

Figure 14:
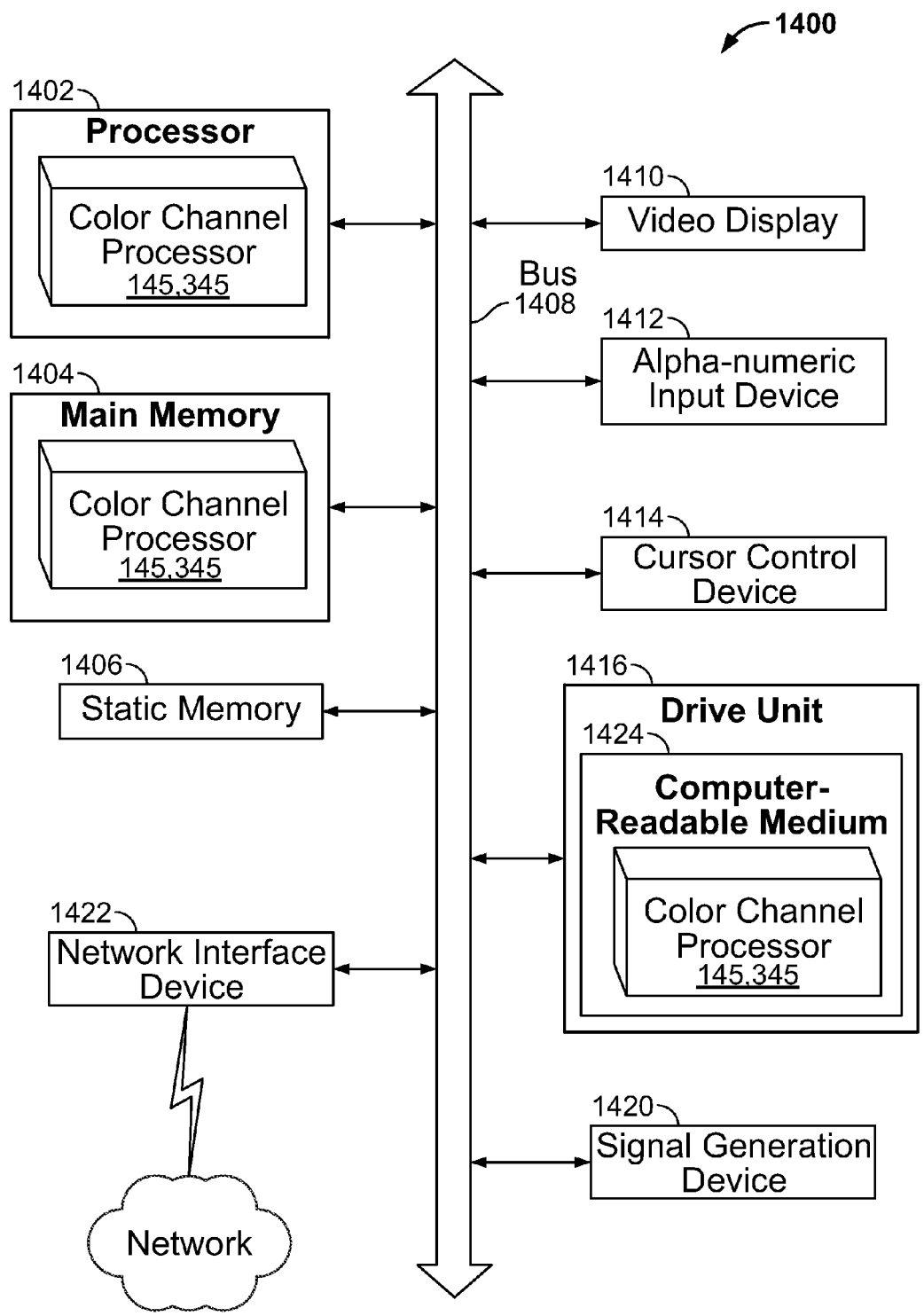
FIG. 14 illustrates a diagrammatic representation of a machine in the example form of a computer system within which a set of instructions, for causing the machine to perform any one or more of the methodologies discussed herein, may be executed.

FIG. 14 illustrates a diagrammatic representation of a machine in the example form of a computer system 1400 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processing device (processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1416, which communicate with each other via a bus 1408.

Processor 1402 represents one or more general-purpose processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1402 may also be one or more special-purpose processing devices such as an application specific integrated circuit (ASIC), a field programmable gate array (FPGA), a digital signal processor (DSP), network processor, or the like. The color channel processor 145, 345 shown in FIGS. 1 and 3, respectively, may be executed by processor 1402 configured to perform the operations and steps discussed herein.

The computer system 1400 may further include a network interface device 1422. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1420 (e.g., a speaker).

A drive unit 1416 may include a computer-readable medium 1424 on which is stored one or more sets of instructions (e.g., instructions of the color space processor 145, 345) embodying any one or more of the methodologies or functions described herein. The instructions of the color space processor 145, 345 may also reside, completely or at least partially, within the main memory 1404 and/or within the processor 1402 during execution thereof by the computer system 1400, the main memory 1404 and the processor 1402 also constituting computer-readable media. The instructions of the color channel processor 145, 345 may further be transmitted or received over a network via the network interface device 1422.

While the computer-readable storage medium 1424 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. The system and method as disclosed herein for transmission, reception, and restoration and upscaling of chroma channels decimated by more than one octave improves the perceptual quality and/or the transmission or storage efficiency of existing image and video compression or transmission systems and methods solves problems in many fields, such as real-time efficiency for over-the-top video delivery, cost-effective real-time reduction of public radio-access-network congestion when both uploading and downloading video and image data from mobile devices, increased real-time pass-band television delivery capacity, increase of satellite transponder capacity, reduction of storage costs for content management systems and network DVR architectures, and high-throughput treatment of images and video at the distribution network core as but a few examples.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, by a processing device, a first set of image data comprising one or more chroma channels and a luma channel;
    reducing, by the processing device, the resolution of the one or more chroma channels to produce one or more reduced-resolution chroma channels;
    arranging, by the processing device, the luma channel and the one or more reduced-resolution chroma channels into a second set of image data, wherein spatial coordinates of the luma channel and the one or more reduced-resolution chroma channels do not overlap in spatial location of the second set of image data; and
    transmitting, by the processing device, the second set of image data to a downstream device.

2. The method of claim 1, wherein the first set of image data and the second set of image data are comprised of a plurality of pixels, each pixel of the plurality of pixels having the one or more chroma channels and the luma channel.

3. The method of claim 1, wherein reducing the resolution of the one or more chroma channels comprises decimating the one or more chroma channels by at least one octave.

4. The method of claim 2, wherein decimating the one or more chroma channels by at least one octave comprises decimating the one or more chroma channels by more than one octave.

5. The method of claim 1, wherein reducing the resolution of the one or more chroma channels comprises decimating the one or more chroma channels using a down-sampling method.

6. The method of claim 5, wherein decimating the one or more chroma channels using a down-sampling method comprises decimating the one or more chroma channels by successive application of one-octave down-sampling steps using an interpolation method.

7. The method of claim 6, wherein the interpolation method is at least one of Lanczos interpolation, bicubic interpolation, or bilinear interpolation.

8. The method of claim 5, wherein decimating the one or more chroma channels using a down-sampling method comprises decimating the one or more chroma channels in a single step using an interpolation method.

9. The method of claim 8, wherein the interpolation method is at least one of Lanczos interpolation or bicubic interpolation.

10. The method of claim 1, further comprising transmitting to the downstream device information comprising the extent of reduction of the resolution of the one or more chroma channels of the first set of image data.

11. The method of claim 1, further comprising transmitting to the downstream device information comprising the arrangement of the luma channel and the one or more reduced-resolution chroma channels of the second set of image data.

12. The method of claim 11, wherein the information comprises an indication that the spatial coordinates of the luma channel and the one or more reduced-resolution chroma channels do not overlap.

13. The method of claim 1, wherein transmitting the second set of image data to a downstream device further comprises:
    transmitting the second set of image data to an encoder, wherein the encoder is operable to encode the second set of image data using an encoding method;
    transmitting, by the encoder, the encoded second set of image data to a transmitter; and
    transmitting, by the transmitter, the encoded second set of image data to the downstream device.

14. A system, comprising:
    a memory of a processing device to receive a first set of image data comprising one or more chroma channels and a luma channel;
    a color channel processor of the processing device, the color channel processor coupled to and having use of the memory, the color channel processor to:
    receive a first set of image data comprising one or more chroma channels and a luma channel;
    reduce the resolution of the one or more chroma channels to produce one or more reduced-resolution chroma channels;
    arrange the luma channel and the one or more reduced-resolution chroma channels into a second set of image data, wherein spatial coordinates of the luma channel and the one or more reduced-resolution chroma channels do not overlap in spatial location of the second set of image data; and transmit the second set of image data to a downstream device.

15. The system of claim 14, wherein reducing the resolution of the one or more chroma channels comprises decimating the one or more chroma channels by more than one octave.

16. The system of claim 14, wherein the color channel processor is further to transmit information comprising the extent of reduction of the resolution of the one or more chroma channels of the first set of image data.

17. The system of claim 14, wherein the color channel processor is further to transmit information comprising the arrangement of the luma channel and the one or more reduced-resolution chroma channels of the second set of image data.

18. The system of claim 17, wherein the information comprises an indication that the spatial coordinates of the luma channel and the one or more reduced-resolution chroma channels do not overlap.

19. A method, comprising:
receiving, by a first processing device from a second processing device, a first set of image data comprising one or more chroma channels and a luma channel, wherein the one or more chroma channels are reduced in resolution relative to the luma channel;
receiving, by the first processing device from a second processing device, first information comprising the extent of reduction of the resolution of the one or more chroma channels and second information comprising the spatial arrangement of the luma channel and the one or more reduced-resolution chroma channels;
reversing, by the first processing device, the spatial arrangement of the luma channel and the one or more reduced-resolution chroma channels in view of the second information to produce a second set of image data;
restoring, by the first processing device, the resolution of the one or more reduced-resolution chroma channels to substantially match the resolution of the separated luma channel in view of the first information to produce a third set of image data; and
transmitting, by the processing device, the third set of image data to a downstream device.

20. The method of claim 19, wherein the first set of image data, the second set of image data, and the third set of image data are comprised of a plurality of pixels, each pixel of the plurality of pixels having the one or more chroma channels and the luma channel.

21. The method of claim 19, wherein the first information indicates that the one or more reduced-resolution chroma channels are decimated by at least one octave.

22. The method of claim 21, wherein the first information indicates that the one or more reduced-resolution chroma channels are decimated by more than one octave.

23. The method of claim 19, wherein the second information indicates that the spatial coordinates of the luma channel and the one or more reduced-resolution chroma channels do not overlap.

24. The method of claim 19, wherein reversing the spatial arrangement of the luma channel and the one or more reduced-resolution chroma channels comprises separating the luma channel from the one or more reduced-resolution chroma channels in view of the first information.

25. The method of claim 19, wherein restoring the resolution of the one or more reduced-resolution chroma channels to substantially match the resolution of the separated luma channel comprises performing a joint-bilateral upsampling of the separated, decimated chroma channels to match the resolution of the separated luma channel.

26. The method of claim 25, wherein the separated luma channel is employed as the statistical prior according to the first information and the second information.

27. The method of claim 25, wherein the joint-bilateral upsampling is an octave-by-octave multi-scale joint-bilateral upsampling of the separated, decimated chroma channels.

28. The method of claim 19, further comprising performing, by the color channel processor, a histogram stretch operation on the restored one or more chroma channels.

29. The method of claim 19, further comprising, wherein restoring further comprises combining the separated restored one or more chroma channels and the luma channel to produce the third set of image data.

30. A system, comprising:
a memory of a first processing device to receive, from a second processing device:
a first set of image data comprising one or more chroma channels and a luma channel, wherein the one or more chroma channels are reduced in resolution relative to the luma channel,
first information comprising the extent of reduction of the resolution of the one or more chroma channels, and
second information comprising the spatial arrangement of the luma channel and the one or more reduced-resolution chroma channels;
a color channel processor of the first processing device, the color space processor coupled to and having use of the memory, the color channel processor to:
reverse the spatial arrangement of the luma channel and the one or more reduced-resolution chroma channels in view of the second information to produce a second set of image data;
restore the resolution of the one or more reduced-resolution chroma channels to substantially match the resolution of the separated luma channel in view of the first information to produce a third set of image data; and
transmit the third set of image data to a downstream device.

* * * * *